June 9, 1959  C. W. COOPER  2,889,582
PIPE SEALING MATERIAL
Filed Dec. 14, 1955

INVENTOR.
Charles W. Cooper
BY
ATTORNEYS.

United States Patent Office 2,889,582
Patented June 9, 1959

---

2,889,582

PIPE SEALING MATERIAL

Charles W. Cooper, Columbus, Ohio, assignor, by mesne assignments, to National Clay Pipe Manufacturers, Inc., Washington, D.C., a corporation of Illinois Application December 14, 1955, Serial No. 553,060

6 Claims. (Cl. 18—59)

This invention relates to low-temperature curable vinyl plastisols and to the new use of such plastisol compositions as a gasket material for sealing pipe joints.

Conventionally, connection is made between clay pipes, such as used for sewer pipes, by means of bell and spigot joints. In the past, these joints have usually been sealed by means of asphaltic materials. The asphaltic material is either molded on the bell and spigot ends in the form of a gasket or the asphaltic material is packed or poured in the annular cavity formed by the junction of the bell and spigot ends of the pipes. The asphaltic materials possess the disadvantages of being temperature sensitive in that the asphaltic materials are hard and friable at low temperatures and are soft at high temperatures. Due to the variable temperatures to which the pipes are exposed, imperfect sealing of the junctions often results between the pipes. In the instance where the asphaltic gaskets are formed on the pipes prior to laying the pipes, problems of storage and shipment are encountered due to the nature of the asphaltic materials. On the other hand, sealing the junction on the job site of laying the pipes is time consuming and difficult due to the limited working space available.

The pipe-sealing material of this invention is a low-temperature curable vinyl plastisol which is easily molded on the pipes in any convenient gasket form. The plastisol material of this invention advantageously tenaciously binds itself to the clay surface of the pipe upon which it is molded. In addition, these plastisol gaskets are flexible, nonrigid, and compressible. Because of the flexibility and compressibility of these plastisol materials, the necessity that the pipes be laid in exact alignment is eliminated. In addition, the compressible nature of these gaskets made of the low-temperature curable vinyl plastisols of this invention decreases the amount of breakage otherwise encountered in laying and fitting the pipe ends together. The gaskets are resistant to chemical attack and substantially insensitive to temperature variations, and, therefore, maintain a good seal of the pipe junction, even when in contact with the fluids carried in sewer pipes.

Furthermore, the vinyl-containing plastisol compositions of this invention are curable (that is, they have a solvating agent which is curable) at temperatures substantially below those necessary for the curing of other known plastisols, thereby facilitating the manufacture of gaskets on the clay pipes. The low-temperature curable plastisols according to this invention are comprised of polyvinyl chloride, an alkyl acrylate ester monomer polymerizable in the presence of the polyvinyl chloride, a plasticizor and the combination of a peroxide catalyst and a tertiary amine activator which renders the plastisol curable at low temperatures. This composition is curable even at ordinary room temperatures.

Referring to the drawings.

Figure 1:
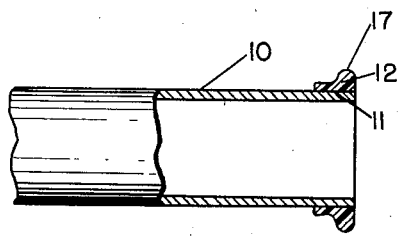
Fig. 1 and Fig. 2 show the spigot and bell ends, respectively, of pipes having molded thereon the monomer modified vinyl gaskets.

In accordance with this invention, a plastisol comprising polyvinyl chloride, an alkyl acrylate ester monomer, such as the alkyl ester of acrylic or methacrylic acids, polymerized in the presence of the polyvinyl chloride, a plasticizer, and the combination of a peroxide catalyst and a tertiary amine activator is molded to form a gasket on the bell and spigot ends of the clay pipes. Additionally, there may be present suitable filler materials and a lubricant. The following table sets forth representative examples of the gasket material.

Table

| Component | Examples | | | | | | |
|---|---|---|---|---|---|---|---|
|  | 1 | 2 | 3 | 4 | 5 | 6 | 7 |
| Polyvinyl chloride, dispersion-type resin | 100 |  | 100 |  | 100 | 100 |  |
| Polyvinyl chloride, general-purpose-type resin |  | 100 |  | 100 |  |  | 100 |
| Methyl methacrylate monomer | 50 | 30 | 40 | 50 | 75 | 100 | 100 |
| Dibutyl phthalate | 100 |  | 50 |  |  |  |  |
| Dioctyl phthalate |  | 100 |  | 50 | 90 | 50 | 50 |
| Hydrocarbon secondary plasticizer (Sovaloid C [1]) |  |  |  | 50 | 100 |  | 50 | 50 |
| Mineral oil (lubricant) |  |  |  |  | 10 |  |  |
| Clay filler |  |  |  | 50 |  | 50 |  |
| Barytes |  |  | 50 |  | 100 |  |  |
| Calcium carbonate |  |  |  |  |  |  | 100 |
| Benzoyl peroxide | 2.0 | 1.0 | 2.0 | 5.0 | 1.0 | 1.0 | 3.0 |
| Dimethyl aniline |  | 1 |  |  |  |  |  |
| Triethanol amine |  |  | 1 |  |  |  |  |
| Tributyl amine |  |  |  | 2 |  |  |  |
| Trihexyl amine |  |  |  |  | 1 |  |  |
| Trioctyl amine |  |  |  |  |  | 1 |  |
| Dimethyl-p-toluidine | 0.2 |  |  |  |  |  | 0.5 |

[1] A light-bodied "true softner" oil, composed entirely of aromatic hydrocarbons. A.P.I. gr. 30; sp. gr. 1.052; flash point 335° F.; distillation range, 550-760° F.; nonpolar.

The plastisol materials of this invention may be compounded in the usual manner. Preferably, the polyvinyl chloride and the plasticizer are thoroughly mixed to form a pasty composition. The peroxide catalyst and filler materials may then be added. After thorough mixing, the alkyl acrylate ester monomer and the tertiary amine activator may be added and again thoroughly mixed. After the mixture is thoroughly blended, it can be poured into a suitably shaped gasket mold appropriately situated on the pipe. In the unpolymerized state, the monomeric alkyl acrylate ester exerts a solvating action on the polyvinyl chloride. Of particular importance is the fact that the mixture cures to a compressible flexible solid at temperatures as low as normal room temperature (68° F.) without the necessity of applying heat from an external source, although heat may be applied to effect a more rapid cure, if desired, without sacrifice in the resiliency of the molded material. Each of the representative examples of gasket materials set forth in the preceding table will cure to compressible flexible solids in less than one hour at normal room temperature without the necessity of applying heat from an external source. At elevated temperatures these representative materials will cure more rapidly. For example, the gasket material of Example VII will cure to a compressible flexible solid in less than 15 minutes at the elevated temperature of 140° F.

Figure 2:
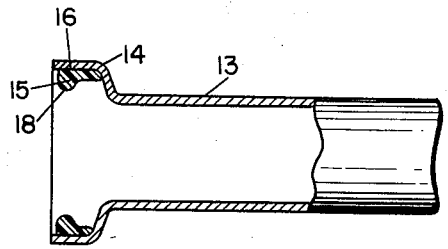
Figure 3:
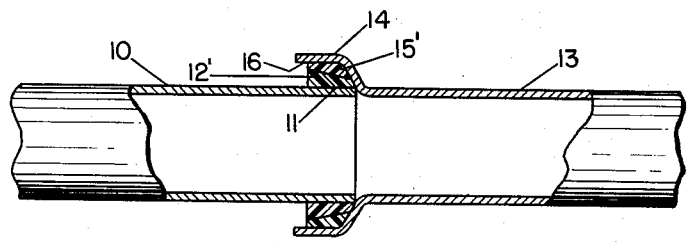
Fig. 3 illustrates a sealed junction between a pair of pipes.
Figure 4:
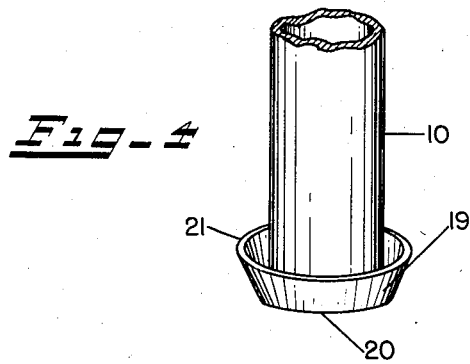
Fig. 4 illustrates a mold surrounding the spigot end of the pipe for forming a gasket thereon.

Referring more particularly to the figures of the drawing in which equivalent parts are identified by the same numerals, the numeral 10 designates the end section of the spigot end of a pipe. A molded sealing gasket is designated by the numerals 12 and 12', respectively, in Figs. 1 and 3 situated on the circumferential portion 11 at the end of the pipe. In Fig. 2, the numeral 13 designates a section of the bell-shaped end of a pipe. The bell end of the pipe is designated generally by the numeral 14. The molded sealing gaskets 15 and 15', shown respectively in Figs. 2 and 3, are formed on the inner circumference 16 of the bell 14. The molding may be of any suitable shape and it is to be understood that the configuration of the molding constitutes no part of this invention. As in the case of Figs. 1 and 2, the gaskets 12 and 15 are shaped with an annular ridge 17 and 18, respectively. When the spigot end of the pipe shown in Fig. 1 is inserted in the bell end of the pipe shown in Fig. 2, the annular ridges 17 and 18 in a design such as this act to lock the pipes together and seal the junction between the two pipes. Illustrative of another way in which the pipes may be joined and sealed, the plastisol gasket may be molded in the shape shown by the gaskets 12' and 15' of Fig. 3. As shown in Fig. 3, the gaskets 12' and 15' are molded with a tapering shape toward the open end of each pipe section. The gaskets 12' and 15' may then be wedged together, and as shown in Fig. 3, are under a state of compression, thereby acting as an aid to hold the pipe sections together and as a seal for the pipe junction. In Fig. 4 is illustrated a mold 19, which is placed so that it surrounds the end of the spigot section 10 of the pipe, for molding a tapered plastisol gasket. The mold 19 is enclosed at the bottom, as at 20, and the top 21 is open for insertion of the spigot end of the pipe 10. With the end of the pipe 10 placed on the bottom 20 of the mold 19, there is formed an annular cavity surrounding the circumference of the pipe 10. The blended plastisol mixture is poured into this annular cavity and permitted to cure in place. After curing, the pipe 10 is removed from the mold 19 with the cured plastisol gasket tenaciously bound to the end of the spigot section of the pipe. A complementary shaped gasket is also formed on the inner circumference of the bell section of the pipe to be joined with the spigot section of the pipe. It is important that the thickness of the gasket be sufficient so that the gaskets contact each other in compression when the spigot section is inserted in the bell section.

The requirements of a sealing gasket material for clay pipes are realized with the plastisol comprised of polyvinyl chloride, and per 100 parts of the polyvinyl chloride, from 30 to 100 parts of monomeric alkyl acrylate ester, from 50 to 100 parts of a plasticizer, from 1 to 5 parts of a peroxide catalyst, and 0.1 part to 2 parts tertiary amine accelerator. As is understood in the art of plastisol compounding, the polyvinyl chloride may be either a dispersion-type or a general-purpose-type. While polyvinyl chloride has been specifically illustrated, it is intended that high-content polyvinyl chloride copolymers such as 95–5 polyvinyl chloride-diethylmaleate copolymers can be used. Although all the examples illustrate the use of the methyl methacrylate monomer, it is to be understood that other monomeric alkyl esters of both methacrylic and acrylic acid may be used. For example, the butyl or ethyl esters of these acids may be used with some sacrifice in both the rate of cure and the ultimate compound hardness. It is intended that the term "acrylate" designate not only the esters of acrylic acid but the esters of methacrylic acid. Further, other plasticizers as known in the art, may be used in place of, or in combination with, the plasticizers shown in the examples. The catalysts and activators necessary to obtain the polymerization of the acrylate monomer and the curing at relatively low temperatures must be, respectively, the peroxide-type catalysts and the tertiary amine activators. Examples of peroxide catalysts other than benzoyl peroxide are lauroyl peroxide, methylethyl ketone peroxide, methylamyl ketone peroxide, and succinyl peroxide. As illustrated, the use of lubricants or filler materials is optional. In the case of large-scale manufacture wherein it is necessary to maintain large quantities of the blended mixtures of these compounds before curing, conventional stabilizers, such as salts of lead, tin, barium, and cadmium may be used. Examples of such stabilizers are lead stearate, dibasic lead phosphate, dibutyl tin maleate, and the barium and cadmium salts of stearic and ricinoleic acid. Such stabilizers may be present in such amounts as from 1 to 10 parts per 100 parts by weight of the polyvinyl chloride.

What is claimed is:

1. The method of sealing bell and spigot junctions of pipes comprising forming and curing at a low temperature a plastisol gasket on the outer circumference at the end of the spigot section of a first pipe, forming and curing at a low temperature a plastisol gasket on the inside circumference at the end of the bell section of a second pipe, each of said gaskets being of sufficient thickness so as to contact each other in compression when the spigot section is inserted in the bell section, and inserting said spigot section of the first pipe in the bell section of the second pipe to form a sealed junction, the composition of said plastisol gasket comprising polyvinyl chloride, from about 30 to 100 parts of an alkyl acrylate ester polymerized in the presence of the polyvinyl chloride, from about 50 to 100 parts of a plasticizer, and the combination of from about 1 to 5 parts of a peroxide catalyst and from about 0.1 part to 2 parts of a tertiary amine accelerator to render the plastisol curable at low temperatures, said parts based on parts by weight per 100 parts of the polyvinyl chloride.

2. The method of claim 1 wherein the peroxide catalyst is benzoyl peroxide and the activator is dimethyl-p-toluidine.

3. The method of preparing gasket seals on bell and spigot clay pipe joints consisting of forming and curing at a low temperature a pourable plastisol comprised of polyvinyl chloride, from about 30 to 100 parts of an alkyl acrylate ester monomer polymerized in the presence of the polyvinyl chloride, from about 50 to 100 parts of a plasticizer, and the combination of from about 1 to 5 parts of a peroxide catalyst and from about 0.1 part to 2 parts of a tertiary amine accelerator to render the plastisol curable at low temperatures, said parts based on parts by weight per 100 parts of the polyvinyl chloride.

4. The method of claim 3 wherein the alkyl acrylate ester is methyl methacrylate and the catalyst is benzoyl peroxide and the accelerator is dimethyl-p-toluidine.

5. A flexible, compressible, elastomeric, pipe joint gasket for joining sections of pipe, said gasket consisting of a molded, low-temperature cured plastisol comprised of polyvinyl chloride, from about 30 to 100 parts of an alkyl acrylate ester monomer polymerized in the presence of the polyvinyl chloride, from 50 to 100 parts of a plasticizer, and the combination of from 1 to 5 parts of a peroxide catalyst and from 0.1 part to 2 parts of a tertiary amine accelerator to render the plastisol curable at low temperatures, said parts per weight based on 100 parts of polyvinyl chloride.

6. A pipe joint gasket of claim 5 wherein the monomer is methyl methacrylate and the accelerator is benzoyl peroxide and the activator is dimethyl-p-toluidine.

References Cited in the file of this patent

UNITED STATES PATENTS

| | | |
|---|---|---|
| 2,284,741 | Johnston | June 2, 1942 |
| 2,517,778 | Fischer | Aug. 8, 1950 |
| 2,558,139 | Knock et al. | June 26, 1951 |
| 2,766,054 | Everhart | Oct. 9, 1956 |
| 2,770,476 | Cleverly | Nov. 13, 1956 |

FOREIGN PATENTS

| | | |
|---|---|---|
| 591,611 | Great Britain | Aug. 22, 1947 |
| 606,936 | Great Britain | Aug. 23, 1948 |